Sept. 23, 1958     C. F. SPANG     2,853,110
MEAT GUIDE FOR GRINDING MACHINES
Filed June 5, 1957
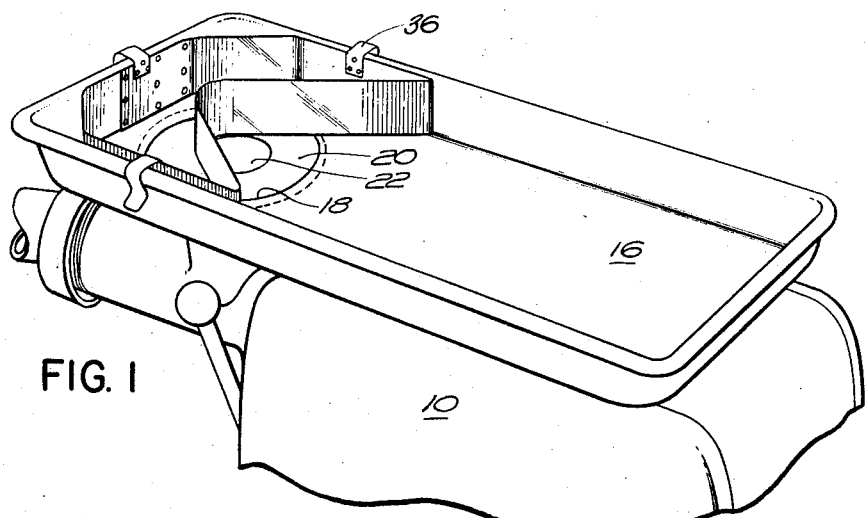
FIG. 1
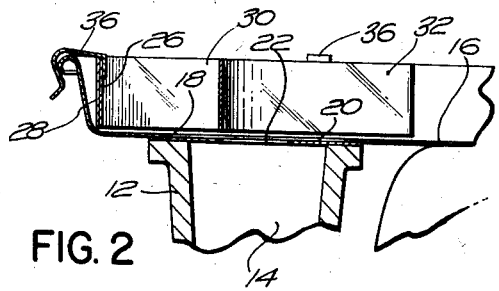
FIG. 2
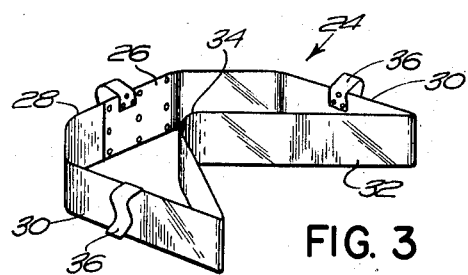
FIG. 3
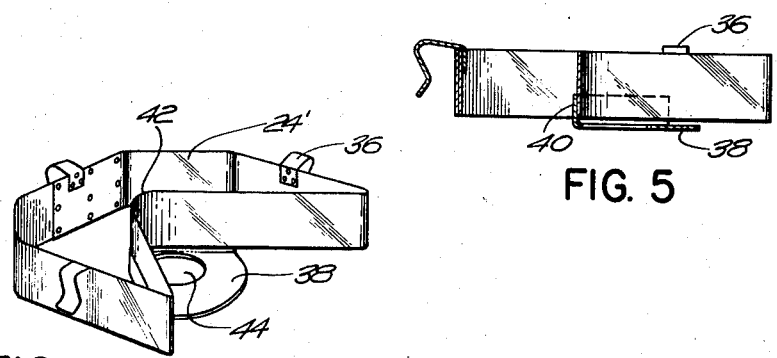
FIG. 4
FIG. 5
INVENTOR.
CARL F. SPANG
BY
ATTORNEYS ized Sept. 23, 1958

2,853,110

MEAT GUIDE FOR GRINDING MACHINES

Carl F. Spang, Wellesley, Mass., assignor to Needham Manufacturing Company Inc., Needham Heights, Mass., a corporation of Massachusetts Application June 5, 1957, Serial No. 663,758

10 Claims. (Cl. 146—182)

This invention relates to a novel guide for facilitating the feeding of meat and other products into a grinding machine. Such machine is provided with a meat holding tray mounted on the grinding machine and having a feeding opening into the hopper. The machine is motor driven and the operator usually feeds the meat with one hand and uses his other hand to arrange the extruded product. The primary object of my invention resides in the production of a guide disposed to fit into the tray and aid the feeding operation without visual attention by the operator.

The guide comprises a body having walls converging to an apex or connecting portion and so disposed in the tray that the converging walls guide the meat to the feeding opening within the apex. The guide is preferably constructed from a strip of sheet material shaped to stand edgewise and to fit within and engage the tray walls. A further feature of the invention comprises means including a plate associated with or carried by the guide and having a feeding opening of reduced size located coaxially of the hopper and facilitating the feeding operation and eliminating the danger of extending the feeding hand into the machine. The production of a guide having these and other novel features hereinafter described comprises a further object of the invention.

These and other features of the invention will be best understood and appreciated from the following detailed description of a preferred embodiment thereof selected for purpose of illustration and shown in the accompanying drawing in which:

Fig. 1 is a fragmentary perspective view of a meat grinding machine employing my invention;

Fig. 2 is a fragmentary vertical section through a portion of the machine;

Fig. 3 is a perspective view of the meat guide shown in Fig. 1;

Fig. 4 is a like view of a modified construction, and

Fig. 5 is a vertical sectional view therethrough.

In the drawing 10 indicates a meat grinding machine having a hopper 12 with downwardly converging walls 14. Mounted on the hopper is a rectangular tray 16 having a bottom opening 18 adjacent to one end of the tray and disposed coaxially over the hopper. A plate 20 preferably disposed between the hopper and tray has a relatively smaller opening 22 within the opening 18 and disposed coaxially of the hopper.

The primary feature of the invention consists in a meat guide 24 illustrated in the drawing as constructed from a strip of sheet material, preferably stainless steel. As illustrated, the strip is secured together at its ends 26 and is bent to a shape providing a rear wall portion 28, two oppositely disposed side wall portions 30 and a forward portion 32 converging rearwardly to an apex or connecting portion 34. The guide as thus constructed is adapted to fit and stand edgewise within the tray as illustrated in Fig. 1 with the portion 28 engaging an end of the tray, the portions 30 engaging the sides of the tray and with the apex portion 34 located at the opening 22. Clips 36 can be provided for securing the guide to the tray.

In Figs. 4 and 5, I have illustrated a modified construction employing a plate 38 in lieu of the plate 20. In this construction the plate 38 is bent upwardly at 40 and welded directly to the apex portion of the guide strip 24'. The horizontal portion of the plate is of a size and shape to fit flush within the opening 18 of the tray forwardly of the apex portion 42 and is provided with a relatively smaller opening 44 therethrough disposed coaxially of the hopper.

A supply of meat to be ground is carried in the tray forwardly of the guide and it will be apparent that my novel guide serves the function of automatically guiding the meat fed by one hand of the operator into the hopper without visual attention, thus leaving the operator's other hand and vision free to catch and arrange the product extruded from the machine. The guide is particularly useful in hamburg patty making machines of the nature shown in Patent 2,795,816 dated June 18, 1957 wherein the operator uses one hand to feed meat into the grinding machine and the other hand to catch and arrange the extruded patties.

The employment of the plates 20 and 38 particularly serves two functions, namely, the smaller opening into the hopper (1) eliminates danger of the operator getting his hand caught in the grinding machine, and (2) provides for dropping the meat directly and coaxially into the hopper without engaging and clinging to the upper portion of the hopper side walls.

While I have herein illustrated and described my novel guide as conveniently comprising a separate unit adapted to be placed within the tray, it will be apparent it can be constructed as an integral part of the tray if desired and that such construction comes within the scope of the invention.

Having thus disclosed my invention, what I claim and desire to secure by Letters Patent is:

1. In combination, a meat grinding machine having a hopper with inner walls converging downwardly from the open top mouth end thereof, a meat holding tray mounted on the hopper and having an opening therethrough into the hopper, a plate associated with the bottom of the tray and having an opening therethrough coaxial with the hopper and of a size smaller than the first named opening and said mouth end of the hopper, and a guide in the tray having walls including converging side wall portions connected at their converging ends at and about a portion of the second named opening and adapted to guide meat thereinto.

2. The combination defined in claim 1 in which the plate is disposed between the hopper and the bottom of the tray.

3. In combination, a meat grinding machine having a hopper with inner walls converging downwardly, a meat holding tray mounted on the hopper and having an opening therethrough into the hopper, a guide in the tray having walls including converging side wall portions connected at their converging ends at and about a portion of the opening and forming an upward extension thereof adapted to guide meat thereinto, and a plate carried by the guide and having an opening therethrough coaxial with the hopper and of a size smaller than the first named opening.

4. The combination defined in claim 3 in which said plate is disposed within the first named opening.

5. In combination, a meat grinding machine having a hopper, a rectangular meat holding tray mounted on the hopper and having an opening therethrough into the hopper adjacent to one end of the tray, and a guide comprising a strip of sheet material standing edgewise in the tray and having a rear wall portion engaging said one end of the tray, two oppositely disposed side wall portions engaging opposite side walls of the tray and a forward wall portion extending toward said one end of the tray and including converging portions connected at their converging ends at and about a portion of the opening and forming an upward extension thereof adapted to guide meat thereinto.

6. In combination, a meat grinding machine having a hopper, a horizontal meat supporting platform mounted on the hopper and having an opening therethrough into the hopper, and meat confining walls extending upwardly from the platform and including converging side wall portions connected at their converging ends at and about a portion of the opening and forming an upward extension thereof adapted to guide meat thereinto.

7. In combination, a meat grinding machine having a hopper, a horizontal meat holding tray mounted on the hopper and having an opening therethrough into the hopper, and a guide in the tray having walls including converging side wall portions connected at their converging ends at and about a portion of the opening and forming an upward extension thereof adapted to guide meat thereinto.

8. A meat guide for use in a tray having bottom and side walls and an opening through the bottom wall disposed over the hopper of a meat grinding machine, the guide comprising a body having meat guiding walls including converging portions connected at their converging ends and cooperating portions disposed to engage against said side walls within the tray and locate said connected ends at and extending about a portion of the opening in the tray in position to guide meat thereto.

9. The guide defined in claim 8 in which said walls comprise a single strip of sheet material.

10. The guide defined in claim 8 plus a plate carried by the guide at and within said connected ends and having a meat feeding opening therethrough within the converging walls at said connected ends.

References Cited in the file of this patent

UNITED STATES PATENTS

| | | |
|---|---|---|
| 145,720 | Chess | Dec. 23, 1873 |
| 1,314,843 | West | Sept. 2, 1919 |
| 1,951,826 | Foster | Mar. 20, 1934 |

FOREIGN PATENTS

| | | |
|---|---|---|
| 49/26 | Australia | Jan. 9, 1926 |
| 274,335 | Great Britain | July 21, 1927 |
| 184,287 | Sweden | Oct. 1, 1936 |